United States Patent [19]

Hoxmeier et al.

[11] Patent Number: 5,550,194
[45] Date of Patent: Aug. 27, 1996

[54] PROCESS FOR MAKING GRAFT BLOCK COPOLYMERS BY GRAFTING ANIONIC POLYMER CHAINS ONTO FUNCTIONALIZED POLYOLEFINS

[75] Inventors: Ronald J. Hoxmeier; Robert C. Job; Bridget A. Spence; Donna A. DuBois, all of Houston, Tex.

[73] Assignee: Shell Oil Company, Houston, Tex.

[21] Appl. No.: 381,453

[22] Filed: Jan. 31, 1995

[51] Int. Cl.$^6$ .................................................. C08F 287/00
[52] U.S. Cl. .......................... 525/250; 525/288; 525/271; 525/268; 525/323
[58] Field of Search ...................................... 525/288, 250, 525/271, 268, 323

[56] References Cited

U.S. PATENT DOCUMENTS

| | | |
|---|---|---|
| 3,627,837 | 11/1968 | Webb . |
| 3,700,638 | 10/1972 | Kawasaki et al. . |
| 3,703,566 | 11/1972 | Duck et al. . |
| 3,786,116 | 1/1974 | Milkovich et al. . |
| 3,842,059 | 10/1974 | Milkovich et al. . |
| 3,862,098 | 1/1975 | Milkovich et al. . |
| 3,879,494 | 4/1975 | Milkovich et al. . |
| 3,894,119 | 7/1975 | Forbes et al. . |
| 3,925,511 | 12/1975 | Loveless . |
| 4,078,019 | 3/1978 | Langer, Jr. . |
| 4,168,921 | 9/1979 | Blanchard . |
| 4,424,308 | 1/1984 | Shannon . |
| 4,500,648 | 2/1985 | Malpass . |
| 4,581,467 | 4/1986 | Malpass . |
| 4,707,521 | 11/1987 | Esneault et al. . |
| 4,761,456 | 8/1988 | Lund et al. . |
| 4,786,689 | 11/1988 | Lund et al. . |
| 4,794,145 | 12/1988 | Lund et al. . |
| 4,851,489 | 7/1989 | Malpass . |
| 4,853,436 | 8/1989 | Ohata et al. . |
| 5,037,890 | 8/1991 | Yokoyama et al. . |
| 5,045,597 | 9/1991 | Asanuma et al. . |
| 5,081,190 | 1/1992 | Asanuma et al. . |
| 5,104,952 | 4/1992 | Babu . |
| 5,118,768 | 6/1992 | Job et al. . |
| 5,122,494 | 6/1992 | Job . |
| 5,159,023 | 10/1992 | Cecchin et al. . |
| 5,162,445 | 11/1992 | Powers et al. . |
| 5,192,616 | 3/1993 | Babu . |
| 5,227,426 | 7/1993 | Tse et al. . |
| 5,272,236 | 12/1993 | Lai et al. . |
| 5,278,272 | 1/1994 | Lai et al. . |
| 5,294,678 | 3/1994 | Tse et al. . |
| 5,314,957 | 5/1994 | Asanuma ............................. 515/245 |
| 5,380,810 | 1/1995 | Lai et al. . |

FOREIGN PATENT DOCUMENTS

| | | |
|---|---|---|
| 0416815A2 | 3/1991 | European Pat. Off. . |
| 91/04995 | 4/1991 | WIPO . |
| 92/12190 | 12/1992 | WIPO . |
| 94/07930 | 4/1994 | WIPO . |

OTHER PUBLICATIONS

D. J. Peterson, *Journal of Organometallic Chemistry*, vol. 9, pp. 373 & 374, 1967.
J. C. Faulk et al., *Journal of Macromolecular Science—Chemistry*, A (7)(8), pp. 1663–68, 1973.
D. B. Collum, Accts. Chem. Res., vol. 25, pp. 448–54, 1992.

*Primary Examiner*—Irina Zemel
*Attorney, Agent, or Firm*—Donald F. Haas

[57] ABSTRACT

A graft block copolymer is comprised of a saturated olefinic backbone with pendent anionic polymer side chains. The polymer is produced by copolymerizing an α—olefin with a 1-alkenyl monomer containing a functional group to which an anionically polymerized polymer can be grafted to produce graft block copolymer, anionically polymerizing at least one anionically polymerizable monomer to form living polymer chains, and then grafting the living polymer chains onto the copolymer to form the graft block copolymer.

2 Claims, No Drawings

PROCESS FOR MAKING GRAFT BLOCK COPOLYMERS BY GRAFTING ANIONIC POLYMER CHAINS ONTO FUNCTIONALIZED POLYOLEFINS

BACKGROUND OF THE INVENTION

This invention relates to a method for making graft block copolymers and particularly to making saturated graft block copolymers without a hydrogenation step. More particularly, the present invention is a process for making saturated graft block copolymers from polyvinyl aromatic hydrocarbons and functionalized polyolefins.

Anionic polymerization utilizing organo alkali metal initiators has long been used to polymerize conjugated diolefins such as butadiene and isoprene and to copolymerize such diolefins with styrenes and substituted styrenes to make styrene-butadiene-styrene and styrene-isoprene-styrene linear block copolymers and similar linear block copolymers. This reaction is usually carried out in an inert hydrocarbon solvent such as cyclohexane or toluene and it is necessary to rigorously exclude oxygen, water or any impurity that can react with a highly reactive propagating species. Under these conditions, the polymeric molecular weights and block structure can be precisely controlled.

Such polymers contain a large amount of aliphatic unsaturation in the diene blocks. Since saturated polymers have certain advantages over unsaturated polymers, such as oxygen and heat stability, it has been desirable to hydrogenate the aliphatic unsaturation in the conjugated diene blocks and this has been accomplished using any of several hydrogenation processes known in the prior art. For instance, the commonly used method is to use a Group VIII metal, particularly nickel or cobalt, catalysts with a suitable reducing agent such as an aluminum alkyl to catalyze the hydrogenation of these polymers. Recently it has been found that bis(cyclopentadienyl)titanium compounds can also be used in the hydrogenation of these polymers. Excellent saturated linear block copolymers are the result of such processes.

The disadvantage in the prior method of producing saturated linear block copolymers is the necessity for the additional hydrogenation and catalyst removal steps. These steps are equipment and time intensive and thereby increase the complexity and cost of producing linear block copolymers. In addition, the hydrogenation catalysts are sensitive to certain poisons making hydrogenation of polymers containing particular functional groups or coupling agent residues difficult or impossible. It would be highly advantageous to have a process by which saturated block copolymers could be produced without the necessity of a hydrogenation step. The present invention provides such a process and also produces graft block copolymers with zero residual unsaturation. The saturated graft block copolymers of the present invention differ from the saturated linear block copolymers of the prior method in the relative location of the component polymer blocks as illustrated in the following figures.

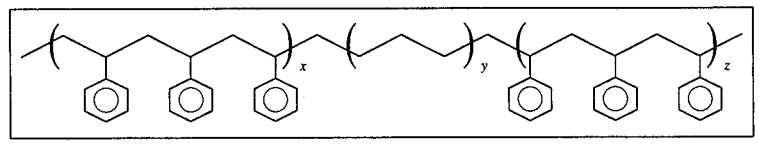

Styrene-Butadiene-Styrene Linear Block Copolymer

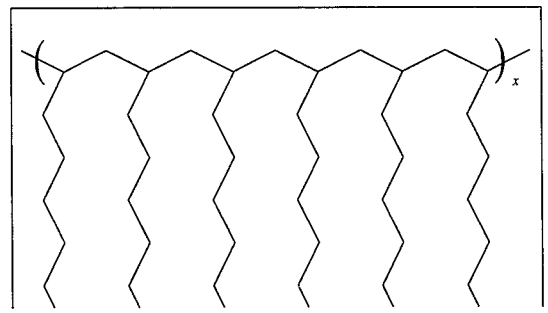

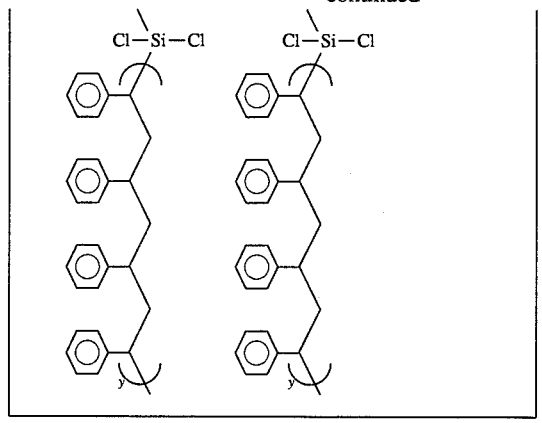

Octene-Styrene Graft Block Copolymer

SUMMARY OF THE INVENTION

The present invention provides a process of producing graft block copolymers which comprises (a) copolymerizing an α-olefin with a 1-alkenyl monomer containing a functional group to which an anionic polymer can be grafted, preferably a silane, most preferably a chlorosilane or a hydridosilane, to produce a graft block copolymer, (b) anionically polymerizing at least one anionically polymerizable monomer to form living polymer chains, and (c) grafting the living polymer chains of (b) onto the copolymer of (a) to form an olefinic polymer having pendent anionic polymer side chains. The present invention also includes a graft block copolymer comprised of a saturated olefinic backbone with pendent anionic polymer side chains.

The graft block copolymers of this invention may be thermoplastic elastomers, tough impact resistant plastics, or stiff plastics. Thermoplastic elastomers can be formed from an amorphous polymer backbone and glassy or semicrystalline polymer pendent grafts which phase separate (through differences in solubility parameter or crystallinity) from the backbone to form a physically crosslinked network which will be load supporting. When the product graft block copolymer is to be used in applications requiring substantial material strength, then it is preferred that the graft block copolymer contain, on average, at least two grafts. Tough, impact resistance plastics can be formed from an amorphous polymer backbone and glassy or semicrystalline pendent grafts when the weight fraction of the pendent graft is greater than about 0.50. In this case, the graft polymer phase will be the matrix and the amorphous polymer backbone must phase separate and will be dispersed. Tough, impact resistant plastics can also be formed from a glassy or semicrystalline polymer backbone with phase-separated pendent amorphous polymer grafts. Stiff plastic polymers can be formed from glassy or semicrystalline polymer backbones with glassy or semicrystalline polymer grafts, which may exist in a single compatible phase or be phase separated.

In a preferred embodiment, the α-olefin is $C_2$ to $C_{30}$, the 1-alkenylhalosilane is dimethylhexenylchlorosilane, and the two monomers are copolymerized in the presence of a transition metal catalyst. It is preferred that the anionically polymerizable monomer be selected from the group consisting of vinyl aromatic hydrocarbons, conjugated dienes, and mixtures thereof (such that the living polymer chains can be random or block copolymers of the two different types of monomers).

The most preferred embodiment of the present invention involves making a saturated graft block copolymer without the necessity of a hydrogenation step. This can be done when the anionically polymerizable monomer is a vinyl aromatic hydrocarbon, or, more generally, contains a single olefinic moiety. Thus, polyvinyl aromatic hydrocarbon, preferably polystyrene, polymer side chains may be grafted onto the saturated olefinic backbone to create a saturated graft block copolymer.

DETAILED DESCRIPTION OF THE INVENTION

The first step of this process involves copolymerizing an α-olefin with a 1-alkenyl functionalized monomer to form a copolymer which is intended to form the backbone of the graft block copolymer of the present invention. This polymerization step may be carried out by using a Ziegler-Natta or metallocene catalyst polymerization process or by using a cationic polymerization process. Other possible methods include free radical or Lewis acid catalyzed processes.

In general, any α-olefin can be used in the practice of this invention but it is preferred that the α-olefin be a $C_2$ to $C_{30}$ olefin. The choice of α-olefin will depend on the intended application for the product graft block copolymer. If a soft, thermoplastic elastomer is desired, then the graft block copolymer will be composed of an amorphous polymer backbone and glassy or semicrystalline polymer grafts. In this case, it is preferred that the α-olefin be a $C_4$ to $C_{30}$ olefin or a mixture of $C_2$ to $C_{30}$ olefins. These olefins are preferred because they invariably produce amorphous materials with relatively low glass transition temperatures ($T_g$). When graft block copolymers are produced from these olefinic backbones and glassy or semicrystalline anionic polymer grafts as described above, the low $T_g$ of the polyolefin provides for retention of elastomeric properties of the graft block copolymer down to low temperatures and a broad service temperature range. $C_4$ to $C_{16}$ α-olefins and mixtures thereof are preferred because they produce soft, tacky amorphous polymer.

If a tough, impact resistant plastic is desired composed of an amorphous polymer backbone and glassy or semicrystalline polymer grafts in which the weight fraction of the grafts is greater than about 0.50, then an α-olefin that produces an amorphous polymer will again be chosen. It is preferred that the α-olefin be a $C_4$ to $C_{30}$ olefin or a mixture of $C_2$ to $C_{30}$ olefins because the low $T_g$ of the product polymer will allow the graft block copolymer to retain ductile behavior of the dispersed phase down to low temperatures and a broad service temperature range. If a tough, impact resistant plastic is desired composed of a glassy or semicrystalline polymer backbone and amorphous polymer grafts then α-olefins that produce a glassy or crystalline polymer will be chosen. In this case, it is preferred that the α-olefin be a $C_2$ to $C_5$ olefin. If a stiff plastic material is desired then α-olefins that produce a glassy or semicrystalline polymer will be chosen. In this case, it is preferred that the α-olefin be a $C_2$ to $C_5$ olefin.

There are many monomers which can be used to place "hooks" in the backbone to which anionic polymers can be grafted. Specifically included within the scope of this invention are monomers of the formula $$CH_2=CH-(CH_2)_n-\overset{R}{\underset{|}{C}}=\overset{R}{\underset{|}{C}}-\overset{R}{\underset{|}{C}}=\overset{R}{\underset{|}{C}}-R$$

Where n≧0 and where R may be alkyl or hydrogen and may be different or the same. 1,3,7-octatriene is one example. Other preferred monomers are those having the formula $$CH_2=CH-(CH_2)_n-Y$$

where n≧0 and Y is selected from the group including halosilane groups, hydridosilane groups, ester groups, aldehyde groups, ketones, halogens, epoxides, and phosphorous groups of the formula P-$Z_2$ where Z is Cl, Br, I, F, hydrogen, ester groups, or combinations of these.

The preferred 1-alkenylhalosilane compounds which can be used in the present invention include $H_2C=CH-(CH_2)_n-SiX_3$ where n≧0, X=halogen, R, or H or combinations thereof, and R is alkyl, or aryl, and at least one X must be halogen. $H_2C=CH-CH_2-SiMe_2Cl$ is preferred because when the presence of ungrafted anionic polymer in the final product is undesirable, this halosilane may easily be removed from the backbone copolymer due to its high volatility.

Also preferred for the same reason are hydridosilane compounds of the formula $$CH_2=CH-(CH_2)_n-SiH_xR_y$$

when n≧0, x+y=3, x≧1, and y≧0. Most preferred compounds have these structures: $CH_2=CH-CH_2-SiH_3$, $CH_2=CH-SiH_3$, $CH_2=CH-SiH_2CH_3$, and $CH_2=CH-CH_2-SiH_2CH_3$. In the last two structure halogen may take the place of H, in which case the silanes would be halosilanes.

Methods for carrying out the copolymerization of the α-olefin and the 1-alkenyl functionalized monomer include the use of metallocene and Ziegler-Natta catalysis as well as cationic polymerization. Metallocene catalysts are organometallic coordination compounds obtained as a cyclopentadienyl derivative of a transition metal or metal halide. Their use in the polymerization of olefins is well known.

A useful Ziegler-Natta catalysis process is described in U.S. Pat. No. 5,045,597 which is herein incorporated by reference. The Ziegler-Natta method of polymerization requires the presence of a catalyst which includes a transition metal compound and which also utilizes an aluminum compound as well as an electron donor. Such transition metal compounds include titanium halides such as titanium trichloride and titanium tetrachloride as well as magnesium chloride supported titanium tetrachloride, magnesium alkoxide supported titanium tetrachloride and certain metallocenes of zirconium, titanium, and hafnium which are known from the art to polymerize α-olefins. The aluminum compound is usually an organo aluminum compound which is preferably selected from the group consisting of trialkyl aluminum, dialkyl aluminum halides, alkyl aluminum sesquihalides and alkyl aluminum dihalides, and aluminoxanes. There are a wide variety of electron donors which can be used and they are usually oxygen or nitrogen containing compounds such as ethers, esters, ortho ethers, alkoxysilicon compounds, and heterocyclic aromatic nitrogen compounds.

The Ziegler-Natta polymerization may be conducted in neat monomer, by solvent polymerization, or by vapor phase polymerization. Generally, polymerization is conducted at a temperature of from 30° C. to 100° C. under a pressure of from atmospheric to the vapor pressure of the 1-alkenyl functionalized monomer at the polymerization temperature and optionally in the presence of a molecular weight control agent such as hydrogen.

If a soft, thermoplastic elastomer or a tough, impact resistant plastic composed of an amorphous polymer backbone and glassy or semicrystalline polymer grafts as described above is desired, then it is important that the catalyst which is chosen is one which tends to produce amorphous polymers. Such catalysts are described in U.S. Pat. No. 5,122,494, 5,188,767, 5,089,573, 5,118,768, 4,874, 737, 4,971,936, and 5,229,477, which are all herein incorporated by reference. A preferred catalyst for use herein is described in U.S. Pat. No. 5,122,494. The catalyst is formed by contacting, in the presence of an inert diluent, an alkyl aluminum halide halogenating agent with a complex magnesium-containing, titanium-containing alkoxide compound prepared by reaction of magnesium alkoxide, titanium tetraalkoxide and a phenolic compound. The complex alkoxide compounds are of somewhat variable stoichiometry but have the general illustrative formula $$Mg_3Ti(OR)_8X_2$$

wherein R independently is alkyl of up to four carbon atoms inclusive and X independently is a monovalent anion derived from a phenolic compound as described below. The diluent is then removed to produce, as a particulate solid, the complex alkoxide compound. This solid is treated with alkyl aluminum halide to produce the olefin polymerization catalyst.

The preferred alkoxides are magnesium ethoxide and titanium tetra ethoxide. The phenolic compound is selected from phenol or an activated phenol (a monohydroxylic phenol of one aromatic ring having aromatic ring substituents other than hydrogen which serve to alter the pKa of the phenolic compound). Suitable phenolic compounds are phenol, o-cresol, and 2,6-di-t-butyl- 4-methylphenol (BHT).

The α-olefin and the functionalized monomer may be cationically polymerized by reacting them in the presence of a cationic polymerization initiator in the presence of a Lewis acid and, generally, an electron donor. The Lewis acid and the electron donor may be complexed together. Lewis acids which can be utilized herein include metal halides, such as aluminum trichloride (and molten salts containing aluminum trichloride), boron trichloride, boron trifluoride and titanium tetrachloride, and organometallic derivatives, such as ethylaluminumdichloride and triethyl aluminum, and oxyhalides, such as phosphorous oxychloride. Electron donors which are useful herein include alkyl amines, pyridines, such as 2,6-lutidine and 2,4,6-collidine, triaryl or trialkyl phosphines, benzaldehyde, and veratrole. The cationic polymerization initiators are generally taken from the group consisting of tertiary alkyl halides such as t-butylchloride and triphenymethylfluoride.

The preferred Lewis acids are aluminum trichloride and boron trichloride because of their higher activity. The preferred electron donors are 2,6-lutidine and collidine because they have been shown to give random copolymers and highly amorphous polymers, respectively (U.S. Pat. No. 5,134,209 and U.S. Pat. No. 5,229,477). The preferred cationic polymerization initiators are cumyl-type derivatives like cumylchloride, alkoxide, or aliphatic tertiary chlorides.

The cationic polymerization may be a batch, semi-continuous, or a continuous process. Generally, the polymerization is carried out at a temperature of from about −100° to about 0° C. under a pressure of from 0 to 10 atm. Another method for copolymerizing the α-olefins and the functionalized monomers is free radical polymerizations.

The α-olefin/functionalized monomer copolymers are used in the present invention as precursors to making the graft block copolymers of the present invention. These copolymers are generally characterized in that they are high molecular weight copolymers with a random distribution of the monomer components. The halosilane groups of these copolymers may also be derivatized to other functional groups by reaction with appropriate reagents such as $H_2O$, alcohols, metal hydrides, and the like. They have other uses as modifiers for polyolefins, such as polypropylene, polyethylene and polybutylene, as a way to incorporate impact resistance and/or polarity into these polymers or blends of these polymers. The halosilanes may be homopolymerized to form high molecular weight polymers by the above processes as well. Such halosilane homopolymers are characterized in that they may have high melting points and may exhibit crystallinity because of chain end tacticity control. These homopolymers are useful for polymer derivatization reactions such as mentioned above for the copolymers to produce engineering thermoplastics or modifiers for engineering thermoplastics.

Any anionically polymerizable monomer should be effective in this invention. Particular monomers which can be used include acrylamides, acrylonitriles, nitrobutene, vinylisocyanate, anhydrides, methacrylates, including methyl methacrylate, alkyl and aryl acrylates, vinyl pyridines, carbodiimides, lactones, lactams, dienes, styrene and styrene derivatives including alkylstyrenes, halogenated methoxy styrenes and nitrostyrene, as well as 1,3 pentadiene and 1,3-octadiene, cyclic siloxanes, and ethylene. The anionically polymerized polymers included herein include polyethers (polyalkylene oxides, polyfurans, etc.), polyesters, polyacetals, and polyphenylene oxide (PPO and PPE).

Also useful herein are acrylic monomers, especially including those with the structure

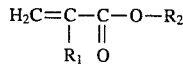

where $R_1$ is hydrogen, phenyl or an alkyl radical which is linear or branched and has from 1 to 10 carbon atoms and $R_2$ is an alkyl radical which has from 1 to 14 carbon atoms, may contain a tertiary amine or an ether linkage, and may be a cyclic hydrocarbon. More specifically, polymer chains which may be used according to the present invention are polymer chains which include acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate, cyclic alkyl methacrylates, such as 2,5-dimethylcyclohexyl methacrylate, and acrylates in which the alkyl group contains an ether linkage, such as tetrahydrofuran acrylate.

As is well known, polymers containing both aromatic and/or ethylenic unsaturation can be prepared by copolymerizing one or more polyolefins, particularly a diolefin, by themselves or with one or more alkenyl aromatic hydrocarbon monomers. The copolymers may, of course, be random, tapered, block, star, radial or a combination of these. When the double bonds in the polyolefin are separated by three or more carbon atoms, the ethylenic unsaturation incorporated into the polymer will be contained in a branch extending outwardly from the main polymer chain but when the polyolefin is conjugated at least a portion of the ethylenic unsaturation incorporated into the polymer may be contained in the polymer backbone.

As is well known, polymers containing ethylenic unsaturation or both aromatic and ethylenic unsaturation may be prepared using anionic initiators or polymerization catalysts. Such polymers may be prepared using bulk, solution or emulsion techniques.

In general, when solution anionic techniques are used, anionically polymerizable polymers including conjugated diolefin polymers, alkenyl aromatic hydrocarbons, and copolymers of conjugated diolefins and alkenyl aromatic hydrocarbons are prepared by contacting the monomer or monomers to be polymerized simultaneously or sequentially with an anionic polymerization initiator. Such initiators include Group IA metals, their alkyls, amides, silanolates, napthalides, biphenyls and anthracenyl derivatives. It is preferred to use an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like; ketones such as methyl ketone (acetone), methyl ethyl ketone, ethyl ketone (3-petanone) and the like.

The polymerization of the anionically polymerized monomers is not ended by the addition of chain terminating agents such as alcohols or hydrogen. It is very important that living anionically polymerized polymer chains remain to be reacted with the copolymer in the third step of the process of the present invention. By living polymer chains it is meant that the polymerization initiator is still a part of the polymer chain and is active and available for further polymerization if more monomer becomes available. In this case, the polymerization is ended when the monomer supply is exhausted. For example, when polystyrene is polymerized and an organo lithium compound is used as the initiator, the living polymer chain can be represented as:

$$PS^-Li^+$$

This is known as polystyryl lithium.

The most preferred embodiment of the present invention is a saturated graft block copolymer which is produced without the necessity for a hydrogenation step. Saturated graft block copolymers are produced herein when the anionically polymerized monomer is one which contains a single carbon-carbon double bond. Examples are vinyl aromatic hydrocarbons, particularly styrene and substituted styrenes, methacrylates, particularly t-butylmethacrylate, vinylpyridines, and ethylene. When these monomers are utilized in the second step of the process of the present invention, the result is a saturated graft block copolymer.

The final step of the process is accomplished by grafting the living polymer chains onto the copolymer. For halosilanes, this takes place by replacement of a halogen attached to the silicon with the living polymer chain. This is accomplished by reacting the two polymers in the presence of an activator such as tetramethylethylenediamine or ethers such as glyme, o-dimethoxybenzene, or ethylene glycoldiethylether, at a temperature of 30° to 100° C. and a pressure of 1 to 10 atm. This step also can be carried out in the absence of activators but it proceeds more slowly to completion.

The copolymerization of the α-olefin and the 1-alkenyl functionalized monomer produces a polymer with a saturated olefinic backbone having pendent saturated alkyl chains having a functional group attached thereto which may be a terminal group or which may be in the internal portion of the chain. In the case of halosilanes, such copolymers may be represented by the following:

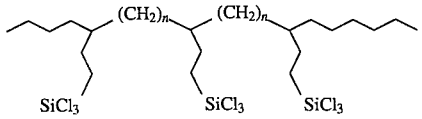

The living polymer chains react with these copolymers at the silicon trichloride sites and the polymer chain actually takes the place of a chloride on the silicon trichloride group in the polymer so that it becomes part of a pendent side chain. In the case of a polystyryl lithium living polymer, the above copolymer is converted to a saturated graft block copolymer with the following formula:

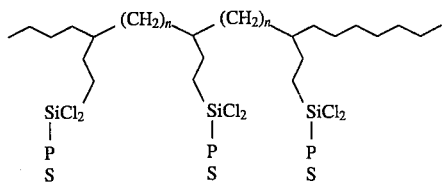

When the appropriate backbone polymer, graft polymer, and weight fraction of graft polymer are chosen, the polymers of the present invention are excellent thermoplastic elastomers. For example, block graft copolymers as exemplified in the above formula with a polystyrene weight fraction from about 0.05 to about 0.50, have dispersed polystyrene domains in an amorphous, rubbery matrix. These materials exhibit high elongation under tensile stress with nearly complete recovery after the stress is removed. Once deformed, the material may be molded by the application of heat and pressure or cast from an appropriate solvent. The original properties of the material are then once again obtained. Other thermoplastic elastomers within the scope of the invention include those with other types of polymeric grafts which are glassy or semicrystalline and phase separate from the backbone polymer forming a dispersed phase. These include block copolymer grafts, such as polystyrene-b-polybutadiene or polystyrene-b-polyisoprene, t-butylmethacrylate grafts, polyvinylpyridine grafts, polyphenylene ether grafts, polyethylene grafts, and the like.

When a thermoplastic elastomer with substantial strength is desired, it is important to control the number of pendent anionic polymer side chains. If there are, on average, less than 2 side chains per backbone polymer, then the resulting graft block copolymer will have low strength. The number of side chains is controlled by the composition of the backbone copolymer and the ratio of graft and backbone polymer chains. It is highly preferred that the graft block copolymer contain, on average, from 2 to 200 pendent anionic polymer side chains per backbone polymer so long as these pendent groups do not exceed 50% by wt. of the total composition. This is preferred because when the graft block copolymers contain greater than 50% w anionic polymer side chains, the glassy or semicrystalline graft polymer become the matrix with dispersed amorphous backbone polymer and the resulting graft block copolymer is no longer elastomeric, but will behave like a toughened plastic.

The polymers made according the present invention have an extremely wide variety of uses. Elastomeric graft block copolymers may be used in all of the applications for which other thermoplastic elastomers have been used. For example, other thermoplastic elastomers are useful in adhesives, sealants, coatings, polymer modification (blending with other thermoplastic polymers such as polyolefins, polycarbonate, polyphenyloxide, etc. to enhance or alter the properties thereof), polymer blend compatibilization, tie layers, asphalt modification, viscosity index improvers, and the like. Block graft copolymers which are tough, impact resistant plastics or stiff plastics may be used in molded and extruded goods, fibers, films, polymer modification, polymer blend compatibilization and tie layers. The polymers may also be crosslinked to provide additional strength and environmental, chemical, and thermal resistance.

EXAMPLES

Example 1 (KT-6)

1.72 grams (7 millimoles) of 7-octenyltrichlorosilane and 14.4 grams (103 millimoles) of 1-decene were polymerized at 65° C. for approximately 16 hours in a sealed glass reactor under a nitrogen atmosphere. The polymerization was carried out in the presence of 40 milligrams of $Mg_6(OCH_2CH_3)_{10.5}TiCl_4$(salicylaldehyde)$_{1.5}$ catalyst containing 5% or 2 milligrams of titanium and 88 milligrams of ethylaluminumdichloride as a 25% solution in toluene (0.7 millimoles of aluminum) and 60 milligrams of triethylaluminum as a 25% solution in toluene (0.53 millimoles aluminum) which contained a total of 1.23 millimoles of aluminum. Therefore, the aluminum:titanium ratio was about 31:1.

The copolymer produced was then dissolved in toluene at 10% solids. Next, polystyrene was polymerized by placing 16 grams of styrene and 32 grams of cyclohexane in a nitrogen purged glass reactor and adding 11 millimoles of sec-butyl lithium. The reaction was initiated at room temperature and then the temperature was increased to 50° C. for 30 minutes to polymerize the styrene. The reaction was not terminated so the resulting product was a living polystyryl lithium polymer chain with a molecular weight of 1300 g/mole. The living polystyryl lithium polymer was added to the solution of the copolymer in toluene along with 9.5 mmoles of dioxo(diethoxyethane). The reaction was allowed to take place until the orange color of the living polystyrene polymer disappeared (30 minutes at 70° C.) and then 14 mmoles of butyllithium was added to the reaction mixture for the purpose of deactivating the remaining Si-Cl bonds. Then the reaction mixture was heated at 80° C. for 1 hour and terminated with isopropyl alcohol (IPA).

The polymer cement was coagulated with isopropyl alcohol and dried under high vacuum for two hours at 75° C. Then it was redissolved in isooctane (to leave behind ungrafted polystyrene). The cement was then centrifuged and part of the supernatant solution was again coagulated with isopropyl alcohol, dried, and analyzed. GPC analysis showed the presence of ungrafted homopolystyrene in the product, so further purification was performed as described below.

The product was redissolved in toluene and the resulting solution was then carefully coagulated by adding isopropyl alcohol dropwise until the rubber precipitated. GPC analysis of the dried rubber showed that all of the ungrafted homopolystyrene had been removed in this manner. GPC analysis also showed that the product graft block copolymer has a UV absorption due to the grafted polystyrene (the copolymer backbone itself does not absorb in the ultraviolet region of the GPC detector).

GPC analysis of the crude reaction mixture showed two ungrafted homopolystyrene peaks at 1300 and 2700 g/mole (in a ratio of about 1:2) which are derived, respectively, from reaction of 1 and 2 living polystyrene polymers with a 7-octenyltrichlorosilane molecule which was not incorporated into the backbone copolymer. Due to the nature of the synthesis, the grafted polystyrene must also have a molecular weight of 1300 g/mole. It may also be assumed that the polystyrene grafts in a similar manner to 7-octenyltrichlorosilane which is incorporated into the copolymer such that one-third of the SiCl$_3$ groups contain 1 polystyrene graft and two-thirds contain 2 polystyrene grafts. The total bound polystyrene content as determined by NMR analysis 37% by weight.

Example 2 (KT-7)

The procedure and reactants in this example were the same as in Example 1. The only differences are in the amounts of the reactants used.

0.89 grams (3.6 millimoles) of 7-octenyltrichlorosilane and 21.8 grams (156 millimoles) of 1-decene were used. The polymerization was carried out in the presence of 40 milligrams of $Mg_6(OCH_2CH_3)_{10.5}TiCl_4$(salicylaldehyde)$_{1.5}$ catalyst containing 5% or 2 milligrams of titanium and 95 milligrams of ethylaluminumdichloride as a 25% solution in toluene (0.75 millimoles aluminum) and 65 milligrams of triethylaluminum as a 25% solution in toluene (0.57 millimoles aluminum) which contained a total of 1.32 millimoles of aluminum. Therefore, the aluminum:titanium ratio was about 33:1. 22.7 grams of styrene in 50 grams of cyclohexane was reacted in the presence of 9.3 millimoles of sec-butyl lithium. The resulting polystyryl lithium molecular weight was 2000 g/mole by GPC analysis. When the two polymers were combined as in Example 1, they were reacted in the presence of 9 millimoles of dioxo and 3 millimoles of butyl lithium were used to deactivate the Si-Cl bonds. The total bound polystyrene content of the product graft block copolymer as determined by NMR analysis is 33% weight, after purification (removal of ungrafted homopolystyrene) as described in Example 1.

Example 3. (KT-8)

The procedure used in this example is the same as Example 1 except for the amounts of the reactants and that the olefin used in the first step was 1-octene. The catalyst was 40 milligrams $Mg_6(OCH_2CH_3)_{10}TiCl_4$-(benzaldehyde)$_2$ containing about 5% Ti and 60 mg of ethylaluminumdichloride as a 25% solution in toluene (0.47 millimoles) and 40 mg of triethylaluminum as a 25% solution in toluene (0.35 millimoles). Therefore, the Al:Ti ratio was about 20:1.

In the first step, 70 grams (625 millimoles) of 1-octene were polymerized with 1 gram (4.06 millimoles) of 7-octenyltrichlorosilane. The polymerization was carried out at 75° C. and held overnight at 80° C. to insure complete reaction.

In the second step, 9 grams of styrene were dissolved in 27 grams of cyclohexane and reacted in the presence of 1.1 millimoles of sec-butyl lithium and heated at 50° C. for one hour. The resulting polystyryl lithium molecular weight was 8600 g/mole by GPC analysis.

The copolymer and the polystyryl lithium were added together and heated at 80° C. until the orange color disappeared. Most of the color faded within several minutes. The reaction was carried out for 15 minutes followed by the addition of 7 millimoles of sec-butyl lithium to deactivate any remaining Si-Cl groups. The polymer was coagulated with acetone to remove ungrafted polystyrene. NMR analysis gave a bound polystyrene content of 6% weight. Acetone coagulation proved to be a very effective method of removing ungrafted homopolystyrene (86% effective in this case). This method of purification was used for all subsequent examples and was very convenient as well as effective.

Example 4 (KT-19K)

The procedure used in this example is the same as Example 1 except for the amounts of reactants and that the olefins used in the first step were 1-octene and 5-hexenyldimethylchlorosilane. 160 mg of $Mg_6(OCH_2CH_3)_{10}TiCl_4$(benzaldehyde)$_2$ catalyst was used, containing about 5.5% Ti and 239 mg of ethylaluminumdichloride as a 25% solution in toluene (1.88 millimoles) and 160 mg of triethylaluminum as a 25% solution in toluene (1.4 millimoles). Therefore, the Al:Ti ratio was about 20:1.

In the first step, 280 grams (2.5 moles) of 1-octene were polymerized with 4 grams (18.4 millimoles) of 5-hexenyldimethylchlorosilane. The polymerization was carried out at 75° C. and held overnight at 80° C. to insure complete reaction.

In the second step, 2 mmoles of 500 molecular weight high vinyl polybutadiene was prepared by anionic polymerization in cyclohexane containing 1000 ppm of dioxo as modifier. Following polymerization of the butadiene, sufficient styrene monomer was added to polymerize a 7000 molecular weight polystyrene block. To the living polybutadiene-polystyrene block polymer was added 150 g of a solution containing 11% by weight of the poly(1-octene)-co-hexenyldimethylchlorosilane prepared as described above. The polymers were reacted at 70° C. for 30 minutes, followed by the addition of 3 mmoles of s-butyllithium to deactivate any remaining Si-Cl groups. The reagents were allowed to react at 80° C. for 1 hour. The reaction was terminated by addition of 1 ml of isopropanol. The graft polymer was recovered by precipitation into acetone to remove any ungrafted polybutadiene-polystyrene block copolymer (which is expected to be highly soluble in acetone due to the very high polystyrene content (96% by wt.). NMR of the final product showed a polystyrene content of 24% weight, a 1,2-butadiene content of about 1% weight, and a 1,4-butadiene content of less than 1% weight.

The cast film had an ultimate tensile strength of 574 psi, an ultimate elongation of 382%, and a tensile set after break of 38%. The Tg's observed by dynamic mechanical thermal analysis are −38° C. for the polyoctene backbone and 116° C. for the polystyrene grafts.

Example 5 (KT-19M)

The backbone octene/5-hexenyldimethylchlorosilane copolymer was prepared as described in Example 4. In the second step, 10 grams of styrene in 50 grams of cyclohexane was polymerized with 5 millimoles of secbutyllithium for 30 minutes at 50° C. to obtain a 2000 g/mole polystyrene polymer. Then 30 grams of a 15% by weight solution of 4-vinyl-N,N'-diethylbenzylamine in cyclohexane (4,5 grams of 4-vinyl-N,N'-diethylbenzylamine) was added along with 1000 ppm dioxo. The 4-vinyl-N,N'-diethylbenzylamine was polymerized at 50° C. for 15 minutes. After polymerization, 1 milliliter of styrene was added to cap the living polymer chain for more efficient coupling with the Si-Cl groups of the copolymer. The living copolymer was added to 140 g of the solution of the backbone copolymer prepared in Example 4 (about 15 grams of copolymer) and reacted at 80° C. for 60 minutes. 5 millimoles of sec-butyllithium was then added to deactivate any remaining Si-Cl bonds and the reagents were allowed to react at 80° C. for 15 minutes. The polymer was terminated with methanol and coagulated from acetone to remove any ungrafted polystyrene-b-poly(4-vinyl-N,N'-diethylbenzylamine). The polymer was redissolved in toluene and recoagulated from acetone to insure complete removal of ungrafted anionic polymer. After washing with methanol and drying under vacuum the polymer was analyzed by elemental analysis for nitrogen and shown to have about 3 percent by weight functionalized aminostyrene monomer incorporated as pendent block.

The product graft block copolymer was dissolved in toluene and a film was cast for property studies. The cast film had an ultimate tensile strength of 261 psi, an ultimate elongation of 1455%, and a tensile set after break of 158%. A Tg of −33° C. was observed by dynamic mechanical thermal analysis for the polyoctene backbone. The Tg of the polystyrene-b-poly(4-vinyl-N,N'-diethylbenzylamine) was not detected.

Examples 6–33

A number of polymers were made with different rubber backbones and functional α-olefins as described in Table 1, below. The physical properties of selected graft block copolymers are given in Table 2, below.

TABLE 1

Characterization of Poly(α-olefin)-g-Polystyrene Polymers

| Example Number | α-olefin monomer composition[a] | Functional α-olefin comonomer[b] | Polystyrene Graft Molecular Weight[c] (10³ g/mole) | Weight Fraction of Polystyrene Grafts[d] |
|---|---|---|---|---|
| 6 (KT14B) | ethylene 40% propylene 60% | (5-hexenyl)dimethylchlorosilane, 0.5% | 5.7 | 0.3 |
| 7 (KT13D) | 1-hexene 100% | allyltrichlorosilane, 2% | 8.2 | .07 |
| 8 (KT13G) | 1-hexene 100% | allyltrichlorosilane, 2% | 28.5 | .05 |
| 9 (KT13Y) | 1-hexene 100% | allyltrichlorosilane, 2% | 10.9 | .12 |
| 10 (KT13Z) | 1-hexene 100% | allyltrichlorosilane, 2% | 19 | .11 |
| 11 (KT24A) | 1-hexene 100% | allyldimethylchlorosilane, 2% | 6.3 | .13 |
| 12 (KT24B) | 1-hexene 100% | allyldimethylchlorosilane, 2% | 6.4 | .12 |
| 13 (KT24C) | 1-hexene 100% | allyldimethylchlorosilane, 2% | 6.3 | .04 |
| 14 (KT24D) | 1-hexene 100% | allyldimethylchlorosilane, 2% | 11.2 | .24 |
| 15 (KT24E) | 1-hexene 100% | allyldimethylchlorosilane, 2% | 16 | .3 |
| 16 (KT24F) | 1-hexene 100% | allyldimethylchlorosilane, 2% | 17.1 | .12 |
| 17 (KT24G) | 1-hexene 100% | allyldimethylchlorosilane, 2% | 8.5 | .34 |
| 18 (KT24H) | 1-hexene 100% | allyldimethylchlorosilane, 2% | 6 | .31 |
| 19 (KT9) | 1-octene 100% | 7-octenyltrichlorosilane, 0.6% | 8.3 | .14 |
| 20 (KT19A) | 1-octene 100% | (5-hexenyl)dimethylchlorosilane, 0.7% | 4.7 | .27 |
| 21 (KT19B) | 1-octene 100% | (5-hexenyl)dimethylchlorosilane, 0.7% | 4.7 | .19 |
| 22 (KT19C) | 1-octene 100% | (5-hexenyl)dimethylchlorosilane, 0.7% | 4.7 | .23 |
| 23 (KT19D) | 1-octene 100% | (5-hexenyl)dimethylchlorosilane, 0.7% | 1.2 | .11 |
| 24 (KT19H) | 1-octene 100% | (5-hexenyl)dimethylchlorosilane, 0.7% | 10 | .14 |
| 25 (AZNP1A) | 1-octene 100% | (5-hexenyl)dimethylchlorosilane, 3% | 7 | .16 |
| 26 (AZNP1B) | 1-octene 100% | (5-hexenyl)dimethylchlorosilane, 3% | 7 | .1 |
| 27 (AZN1A) | 1-octene 100% | (5-hexenyl)dimethylchlorosilane, 3% | 5.6 | .51 |

TABLE 1-continued

Characterization of Poly(α-olefin)-g-Polystyrene Polymers

| Example Number | α-olefin monomer composition[a] | Functional α-olefin comonomer[b] | Polystyrene Graft Molecular Weight[c] ($10^3$ g/mole) | Weight Fraction of Polystyrene Grafts[d] |
|---|---|---|---|---|
| 28 (AZN1B) | 1-octene 100% | (5-hexenyl)dimethylchlorosilane, 3% | 5.6 | .51 |
| 29 (AZN1C) | 1-octene 100% | (5-hexenyl)dimethylchlorosilane, 3% | 5.6 | .52 |
| 30 (25ANOH2) | 1-octene 100% | allyldimethylchlorosilane, 1.2% | 10 | .12 |
| 31 (KT25B) | 1-octene 100% | allyldimethylchlorosilane, 1.2% | 4 | .06 |
| 32 (ZNA13A) | 1-tetradecene 16% 1-hexadecene 49% 1-octadecene 35% | (5-hexenyl)dimethylchlorosilane, 4.9% | 6.3 | .16 |
| 33 (ZNA13C) | 1-tetradecene 16% 1-hexadecene 49% 1-octadecene 35% | (5-hexenyl)dimethylchlorosilane, 4.9% | 1.5 | .2 |

[a] Type and wt. % of total unfunctionalized α-olefin added to polymerize graft block copolymer backbone.
[b] Type and percent mole of functional α-olefin added to polymerize graft block copolymer backbone.
[c] Determined by Gel Permeation Chromatography on crude reaction mixture after formation of the graft block copolymer. Values reported are the weight average molecular weight determined for unreacted homopolystyrene which must be equivalent to the weight average molecular weight of the polystyrene grafts of the graft block copolymer due to the nature of the synthesis.
[d] Determined by $^1$H NMR analysis on product graft block copolymer.

TABLE 2

Properties of Poly(α-olefin)-g-Polystyrene Polmers

| Example Number | Rubber $T_g$ (°C.)[a] | Polystyrene $T_g$ (°C.)[a] | Ultimate Tensile Strength (psi)[b] | Ultimate Tensile Elongation (%)[b] | Tensile Set 10 min after break (%)[c] |
|---|---|---|---|---|---|
| 6 (KT14B) | −38, −18[d] | 91 | 1959 | 674 | 108 |
| 7 (KT13D) | −13 | ND[e] | 118 | 1221 | 52 |
| 9 (KT13Y) | −15 | 116 | 414 | 1302 | 75 |
| 10 (KT13Z) | −15 | 114 | 232 | 708 | 43 |
| 11 (KT24A) | −16 | 93 | 1500 | 1208 | 70 |
| 12 (KT24B) | −14 | 97 | 1110 | 1550 | 82 |
| 13 (KT24C) | —[f] | —[f] | 108 | 1769 | —[f] |
| 14 (KT24D) | −18 | 109 | 829 | 380 | 58 |
| 15 (KT24E) | −20 | 114 | 604 | 413 | 69 |
| 16 (KT24F) | −15 | 116 | 229 | 1117 | 89 |
| 17 (KT24G) | —[f] | —[f] | 491 | 282 | 27 |
| 18 (KT24H) | —[f] | —[f] | 620 | 460 | —[f] |
| 19 (KT9) | −39 | 101 | 274 | 392 | 25 |
| 20 (KT19A) | −39 | 94 | 667 | 903 | —[f] |
| 21 (KT19B) | −33 | ND | 404 | 1134 | —[f] |
| 22 (KT19C) | −35 | ND | 476 | 1112 | 171 |
| 24 (KT19H) | −37 | ND | 316 | 816 | 40 |
| 25 (AZNP1A) | —[f] | —[f] | 512 | 1139 | 115 |
| 27 (AZN1A) | −36 | 90 | 758 | 69 | 25 |
| 28 (AZN1B) | −36 | 94 | 816 | 104 | 43 |
| 29 (AZN1C) | −36 | 92 | 812 | 13 | 0 |
| 30 (25ANOH2) | −43 | ND | 148 | 631 | —[f] |
| 32 (ZNA13C) | —[f] | —[f] | 702 | 522 | 23 |

[a] Determined by Dynamic Mechanical Thermal Analysis operating in tensile mode at a frequency of 11 Hz.
[b] Test performed on a Instron Model 4505 using dumbbell shaped specimens with a 1 inch gauge length.
[c] Percentage increase in specimen length measured 10 minutes after specimen breakage.
[d] Sample showed two peaks in the tan delta curve.
[e] Polystyrene transition not detected.
[f] Test not performed on this sample.

The data in Table 2 show that the graft block copolymers of this invention composed of amorphous backbone polymers and glassy polymer grafts of less than 50%w of the total polymer composition show elastomeric tensile behavior with high ultimate elongations and good recovery. Examples 27, 28, and 29 containing 51–52% by weight glassy polystyrene grafts do not exhibit elastomeric tensile behavior. Instead, the samples show plastic-like behavior indicative of a continuous glassy polystyrene phase and a dispersed amorphous polyolefin phase.

Example 34 (KT-19E) (2-vinylpyridine example)

The backbone polyoctene-co-5-hexenyltrichlorosilane polymer was prepared as described in Example 4. 50 g of this solution (5.4 g of functionalized copolymer) was charged to a reactor bottle. In a separate bottle, 12 g styrene in 36 g cyclohexane was polymerized at 50° C. for 30 minutes with 10 mmoles s-buLi (PS⁻Li⁺ MW=1200). To this was added 2 g 2-vinylpyridene (2-VP) which was allowed to polymerize 10 minutes @50° C. to give PS-P-2VP⁻Li⁺ (P-2VP MW=200). This solution was then added to the functionalized copolymer solution along with 1000 ppm ethyleneglycoldiethylether and reacted at 70° C. for 1 hour, then terminated with methanol, coagulated with acetone, and dried. Elemental analysis for nitrogen showed the polymer product to contain about 1.1% by weight 2-VP.

Example 35

The graft block copolymer prepared in Example 15 was compounded with polystyrene, polypropylene, mineral oil, and stabilizers to produce an elastomeric molding compound as described below. The blend formulation is as follows:

TABLE 3

| Blend Formulation | |
|---|---|
| Ingredient | % w |
| Ex. 15 Graft Block Polymer | 36.941 |
| Mineral Oil[a] | 36.941 |
| Polypropylene[b] | 18.471 |
| Polystyrene[c] | 7.388 |
| Irganox 1010[d] | 0.074 |
| DLTDP[e] | 0.185 |

[a] Penreco 4434. White Mineral Oil.
[b] PP 5820. Huntsman Chemical Corp.
[c] Piccotex 125. Hercules.
[d] Tetrakis(methylene(3,5-Di-tert-butyl-4-hydroxyhydrocinnamate)methane.
[e] Dilaurylthiodipropionate. Antioxidant/stabilizer from American Cyanamid.

The oil was first dispersed onto the graft block copolymer which was then dry blended with the other ingredients. The blend was prepared on a Custom Scientific Instruments melt mixer with a 5 cm$^3$ capacity. Mixing was performed at 200° C. for 4 minutes at 150 rpm. The resulting elastomeric compound was compression molded into a plaque of approximately 0.017 in thickness for physical property testing.

The compression molded plaque had an ultimate tensile strength of 405 psi, an ultimate elongation of 225%, a tensile set after break of 27%, and a Shore A hardness (stacked samples) of 47. These properties show that a soft, strong, elastomeric compound can be prepared from the block graft copolymers of this invention. Such compounds would be useful in a variety of molded goods applications.

Example 36

The graft block copolymer prepared in Example 4 was cast into a two films (approximate thickness of 0.01 and 0.02 inch) from toluene. The films were crosslinked by exposure to electron beam irradiation. The crosslinked polymer films were then tested for % volume swell in toluene (after approximately 16 hrs) and stress/strain properties. These results, compared to a polymer film before crosslinking are given in Table 4.

TABLE 4

| Polymer Film Thickness (inch) | Electron Beam Crosslinking Conditions | Ultimate Tensile Strength (psi)[a] | Ultimate Tensile Elongation (%)[a] | % Toluene Gel[b] |
|---|---|---|---|---|
| 0.02 | none | 540 ± 22 | 386 ± 12 | 0 |
| 0.02 | 5 Megarads, 170 kvolts | 574 ± 22 | 401 ± 31 | 45 |
| 0.01 | 8 Megarads, 165 kvolts | 436 ± 67 | 250 ± 17 | 100 |

[a] Values reported are the mean S.D. of at least three independent measurements.
[b] Values reported are the percentage of the original film weight retained after approximately 16 hrs of immersion in toluene at ambient temperatures.

The data in Table 4 shows that the graft block copolymers of this invention can be effectively crosslinked by electron beam irradiation leading to materials with improved environmental and chemical resistance.

The following experiments were carried out to demonstrate the superiority and different character of the polymers of the present invention compared to polymers in the prior art. EPDM (Nordel 1320) has about 4% unsaturation from 1,4-hexadiene comonomer of which 2.7% is "out-of-chain" and 1.3% is "in-chain."

Upon lithiation at allylic positions, the "out-of-chain" olefin can be lithiated either at the terminal carbon (type A) or at the internal carbon (type B). The "in-chain" olefin will be lithiated to give type C. Upon growing the styrene block, one gets PS grafts located in 3 distinct locations (again, types A, B, or C). Upon ozonolysis (cleavage of the residual olefin), the fate of the 3 PS graft types and of the EPDM itself is as follows.

Type A and C grafts will be cleaved by $O_3$, thus resulting in loss of strength (backbone cleavage). Only type B will survive ozonolysis. However, there are 1.3% "in-chain" olefins, most of which are not grafted sites. These too will undergo scission with $O_3$ resulting in severe backbone degradation. Since the systems of the present invention have zero residual unsaturation, they show superior resistance to $O_3$.

Example 37

(Comparative Example 1 similar to Example 14 from U.S. 4,761,456) (ZNA-15)

EPDM (Nordel 1320) in cyclohexane at 8.7% solids was lithiated for 3 hours at 10° C. with s-buLi/TMEDA (0.9:1 mmoles/mmole). Then styrene monomer was added (target MW=3600) and polymerized at 50° C. for 30 minutes. The reaction was then terminated with methanol, coagulated into 3 volumes of acetone, dried, and analyzed. PS MW=5400; polystyrene content=31% by wt. in EPDM-g-PS product (about 60% grafted and 40% homopolystyrene resulting from incomplete lithiation of EPDM).

A 0.2% wt. solution of this copolymer in carbon disulfide was treated with an ozone/gas stream at −80° C. for 5 minutes and then purged with $N_2$ gas until the blue color of ozone disappeared. It was warmed to room temperature and several grams of triphenylphosphine were added to decompose any reactive oxidation products. The product was analyzed by gel permeation chromatography (GPC) and before ozonolysis, shows a strong EPDM-PS peak at about 15 minutes retention time and a smaller peak of residual homopolystyrene at about 21–22 minutes retention time.

After ozonolysis, the GPC shows severe degradation of the EPDM-g-PS peak and a large increase in the homopolystyrene peak at 22 minutes retention time. From peak areas, it was determined that 93% of the grafted PS blocks were cleaved in the ozonolysis experiment and this accounts for the large increase in the homopolystyrene peak. Thus, only 7% of the grafted PS survived the ozonolysis experiment. This will result in almost complete loss of properties.

Example 38

(Comparative Example 2-present invention)

The polymer (from Example 18) whose elastomeric block is composed of a copolymer of 1-hexene and allyldimethylchlorosilane and which contains 31% by wt. grafted PS (MW=6000) was ozonolyzed as described in Example 37 for EPDM-g-PS and the GPC's were compared for this material both before and after ozonolysis.

Unlike the EPDM-g-PS example, there was no evidence of degradation of the invention polymer after ozonolysis. From the peak areas it was determined that 100% of the polymer survived the ozone experiment (0% degradation). Thus, the superior stability of these materials over EPDM-g-PS has been demonstrated. Similar improvements in thermal and UV stability can also be expected.

Example 39

(1,3,7-octatriene comonomer in ZN polymers: potential initiation and grafting sites for PAO-g-PS block copolymers)

Polystyrene was grafted onto a polyoctene backbone containing about 1 mole % 1,3,7-octatriene in which a significant fraction of the monomer had residual pendent diene moieties along the polyalpha-olefin (PAO) chain. Polystyryl lithium was synthesized separately and added to the PAO cement under nitrogen. The grafting reaction was allowed to proceed for 30 minutes. The polymer was terminated with methanol, coagulated from acetone, and dried in vacuo. The results are shown in Table 5.

TABLE 5

| Sample No. | PSMW[c] | PSC[d] |
|---|---|---|
| ZNA-9A[a] | 5,400 | 0.7% |
| ZNA-9B[a] | 5,400 | 0.7% |
| ZNA-9C[b] | 6,200 | 4.3% |

[a]Grafting reaction performed at 50° C.
[b]Grafting reaction performed at 60° C. in the presence of 1000 ppm ethyleneglycoldiethylether.
[c]Polystyrene graft molecular weight from GPC.
[d]Polystyrene content (% by weight) from $^1$H NMR.

We claim:

1. A process for producing graft block copolymers which comprises:

(a) copolymerizing an α-olefin with a 1-alkenyl monomer containing a functional group to which an anionic polymer is grafted to produce a graft block copolymer by a polymerization process which is capable of producing a saturated olefinic backbone, said process selected from the group consisting of Ziegler-Natta catalyst, metallocene catalyst, cationic, free radical, and Lewis acid catalyzed polymerization processes, (b) anionically polymerizing at least one anionically polymerizable monomer to form living polymer chains, and (c) subsequently grafting the living polymer chains of (b) onto the copolymer of (a) to form a graft block copolymer having a saturated olefinic backbone with pendent anionic polymer side chains.

2. A saturated graft block copolymer having a polymer backbone comprised of a copolymer of an α-olefin and a 1-alkenyl halosilane monomer of the formula

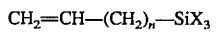

$$CH_2=CH-(CH_2)_n-SiX_3$$

where $n \geq 0$, X is halogen, R, or H, or combinations thereof, and R is alkyl or aryl, and at least one X must be halogen, which has been reacted with anionically polymerized living polymer chains such that at least one living polymer chain replaces at least one X group in the halosilane to form a saturated graft block copolymer with the following formula where PS represents polystyrene blocks.

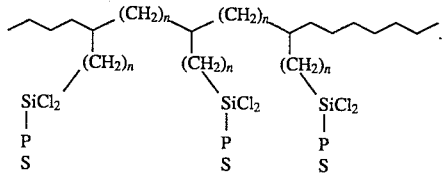

* * * * *